United States Patent [19]
Lancaster

[11] 3,923,658
[45] Dec. 2, 1975

[54] VEHICLE WASHING PLANT

[75] Inventor: Peter John Lancaster, Aldershot, England

[73] Assignee: E. B. Burdon (Engineers) Limited, England

[22] Filed: Dec. 12, 1973

[21] Appl. No.: 426,642

[52] U.S. Cl. ............... 210/108; 210/130; 210/167
[51] Int. Cl.² ............................................. B01D 23/24
[58] Field of Search ......... 15/DIG. 2; 210/167, 169, 210/194, 195, 196, 197, 263, 265, 268, 283, 284, 287, 290, 291, 446, 503, 130, 108

[56] References Cited
UNITED STATES PATENTS

| 316,885 | 4/1885 | Dumont | 210/284 |
| 400,736 | 4/1889 | Blake et al. | 210/290 X |
| 406,189 | 7/1889 | Baker | 210/290 X |
| 590,868 | 9/1897 | Wanner et al. | 210/290 X |
| 989,965 | 4/1911 | Harloe | 210/283 |
| 2,874,847 | 2/1959 | Diamond | 210/291 |
| 2,890,838 | 6/1959 | Jannsen | 210/291 X |
| 3,384,239 | 5/1968 | Berardl | 210/167 |
| 3,503,516 | 3/1970 | Harms et al. | 210/457 |
| 3,550,778 | 12/1970 | Kesselmann | 210/167 |
| 3,618,774 | 11/1971 | Delphin | 210/169 |

Primary Examiner—Theodore A. Granger
Attorney, Agent, or Firm—Oblon, Fisher, Spivak, McClelland & Maier

[57] ABSTRACT

A vehicle washing plant fitted with a water recycling circuit providing water for a washing cycle and a rinsing cycle and including a main filter containing a granulated filter medium, preferably activated carbon, and a back-wash filter, the circuit being connected to supply water for the rinsing cycle firstly through the back-wash filter and subsequently through the main filter with preferably water for the washing cycle passing through the back-wash filter only; two preferred types of main filter are described which comprise a plurality of filter receptacles connected in series within a common casing at least one of the receptacles being easily replaceable.

3 Claims, 3 Drawing Figures

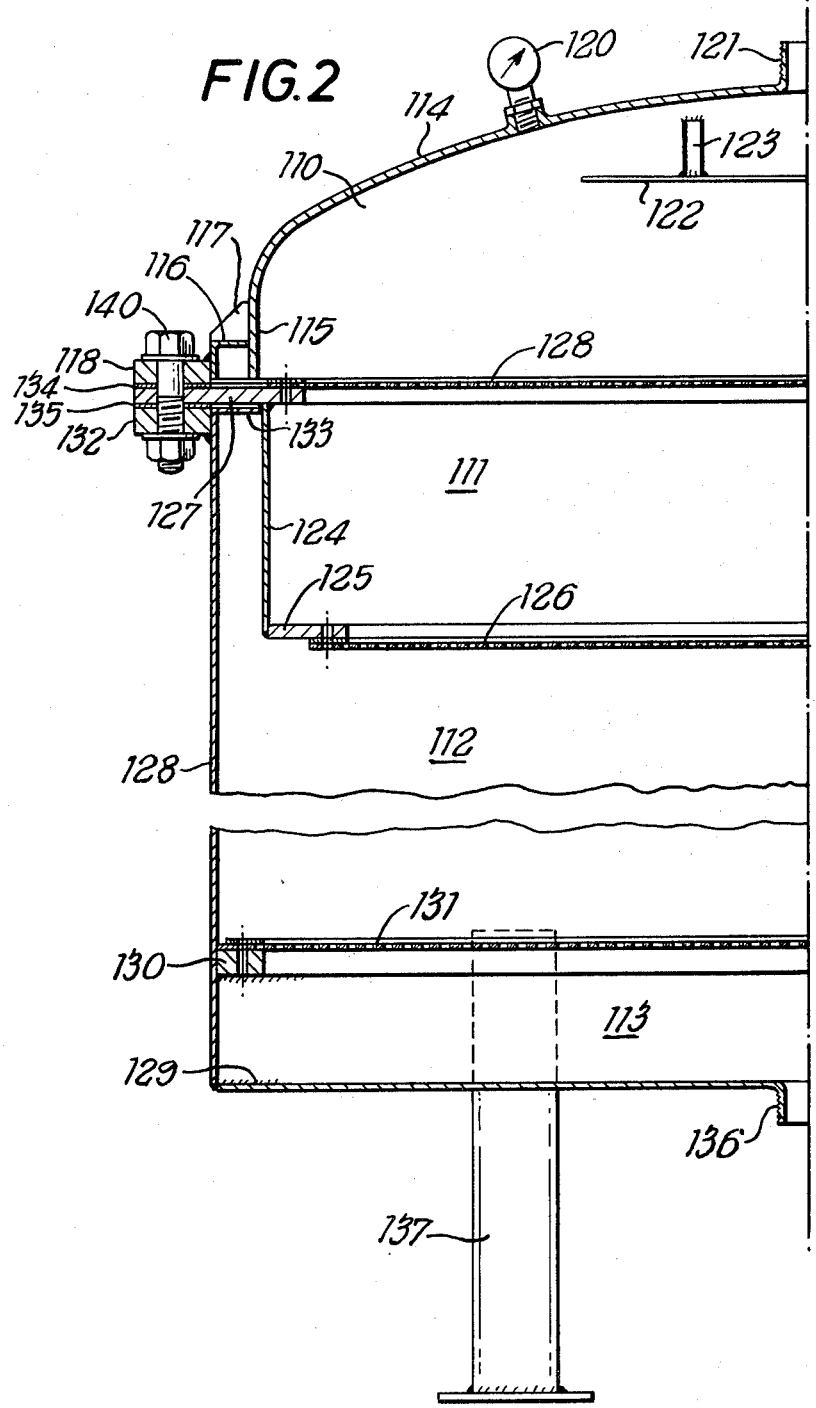

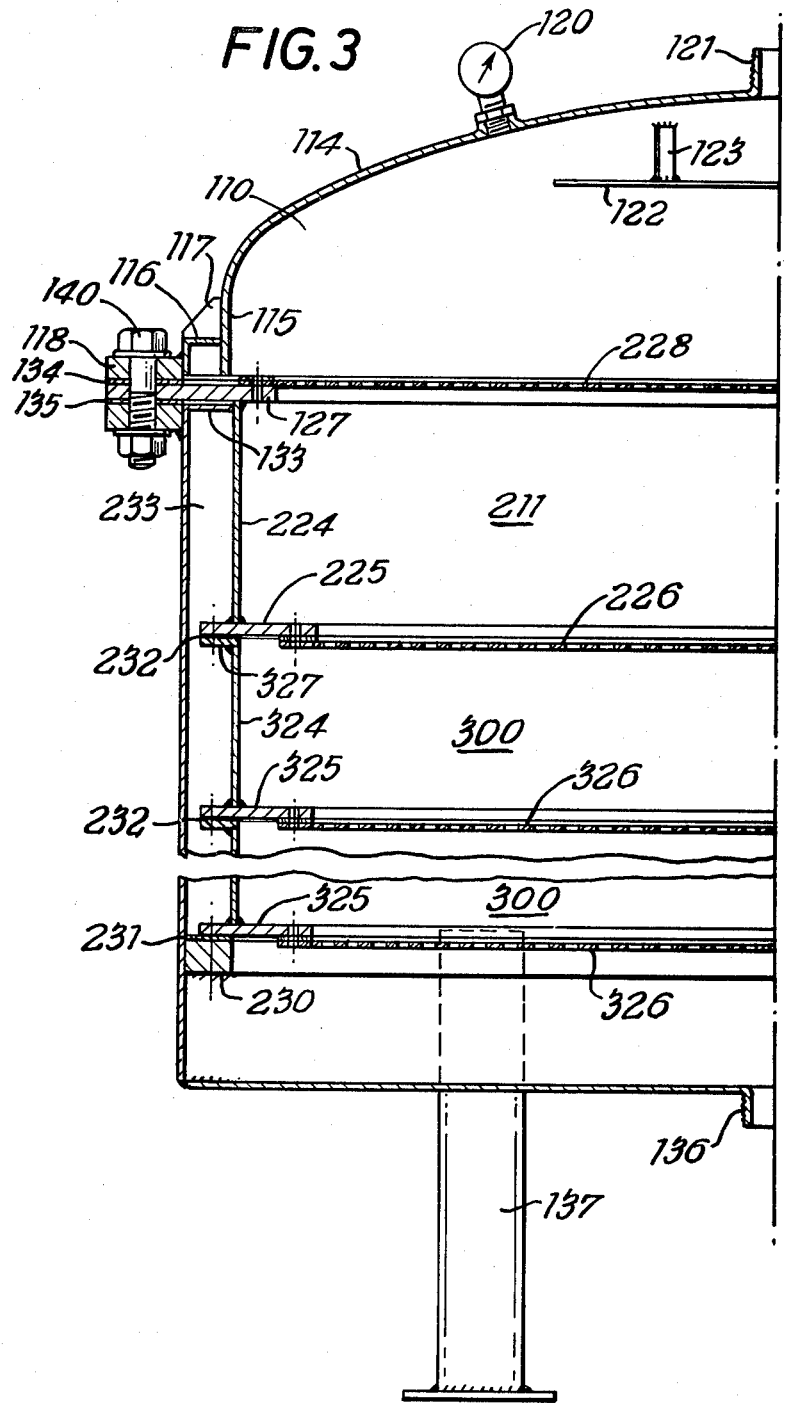

3,923,658

VEHICLE WASHING PLANT

BACKGROUND OF THE INVENTION

The present invention relates to vehicle washing plants and to filters for use in such plants. Various types of vehicle washing plant exist with different degrees of automation depending upon the type of vehicle to be washed for example, motor-cars or automobiles, lorries, buses and coaches, and railway carriages and engines. The present invention is principally concerned with the supply of water for such plants which may be of any of the types mentioned although it has particular application to automated automobile washing plants in which the automobile is driven into a washing chamber and is there subjected to at least one washing cycle and at least one rinsing cycle. It is normally necessary in any vehicle washing plant to adopt at least one washing cycle and at least one rinsing cycle and the invention distinguishes between these cycles. In the case of plants fitted with alternate washing and rinsing cycles, the "rinsing cycle" as the term is adopted in this specification, necessarily applies to the final rinse to which the vehicle is subjected, although clearly the water supply used for such treatment may be used in intermediate cycles also.

Increasing attention is being paid particularly by local authorities licensing the use of vehicle washing plants both to the quantity of water consumed and also to the disposal of waste water and the contaminants carried by such water, particularly oils, detergents and waxes. Not only must there be a safe disposal system for such contaminants but also the supply of water may be restricted at times of water shortage. This applies not only in areas in which water is restricted generally but increasingly to areas where water supplies have previously been unrestricted but where the consumption has increased to a level where unrestricted water can no longer be supplied.

SUMMARY OF THE INVENTION

It is therefore becoming increasingly necessary to fit vehicle washing plants with a water recycling circuit and the invention is directed to the provision of such a recycling circuit which allows an optimum use of water for the different operating cycles of the plant, reduces waste water and allows controlled disposal of contaminants.

According to the invention there is provided in a vehicle washing plant fitted with a water recycling circuit providing water for a washing cycle and a rinsing cycle, the improvement in which the circuit includes a main filter containing a granulated filter medium, and a back-wash filter, the said circuit being connected to supply water for the rinsing cycle firstly through said back-wash filter and subsequently through said main filter. Preferably the said circuit supplies water for the washing cycle through the said back-wash filter only.

The plant may include a vehicle washing chamber having an inlet and a drain, a sump connected to the washing chamber drain, and a settling tank having an inlet and outlet, said back-wash filter having an inlet and outlet and being connected between said sump and said settling tank inlet. A first pump may be connected to supply water from the sump to the settling tank via the back-wash filter and a second pump may be provided to pump water from the settling tank to the washing chamber.

The plant may include a selector valve system for supplying water from the settling tank alternatively directly to the washing chamber for the washing cycle or alternatively via the main filter for the rinsing cycle. This may consist of a single two-way or three-way valve or individual valves. All the valves may be for example solenoid operated and operated according to an automatic programme or directly from a control panel.

There may be provided a second back-wash filter downstream of the settling tank which may be used in various circumstances, for example should the main filter be out of operation for a short period or should for some reason the water in the settling tank be of insufficient purity for use in the main washing cycle. Since back-wash filters have cleansing cycles when they are out of operation for a short period, an automatic valve in a by-pass line for this back-wash filter may be provided to by-pass it should water be required by the washing chamber during the brief period of the cleansing cycle.

The main filter contains a granulated filter medium which is preferably activated carbon. However, other granular media may be used for example anthracite, limestone, sand or gravel and indeed fibrous or sponge filter media. It preferably contains two filter beds in series, at least the upstream filter bed being replaceable. The preferred main filter, which is an independent feature of the invention, comprises an inlet header, an outlet header, an upper receptacle for receiving a filter medium and having a foraminous floor and a peripheral wall, and at least one lower receptacle for receiving a filter medium and having a foraminous floor and a peripheral wall, means retaining the headers and receptacles in peripheral sealing engagement for flow of fluid downwardly sequentially through the inlet header, upper receptacle, lower receptacle and outlet header, said retaining means allowing ready access to and replacement at least of said upper receptacle.

Further preferred features of the invention will become apparent from the following description of preferred embodiments and from the appendant claims.

BRIEF DESCRIPTION OF DRAWINGS

Embodiments of the invention are hereinafter described with reference to the accompanying drawings in which:

FIG. 2 is a cross-sectional view of the preferred form of the main filter; and

FIG. 3 is a view similar to FIG. 2 of another form of the main filter.

DETAILED DESCRIPTION OF DRAWINGS

Figure 1:
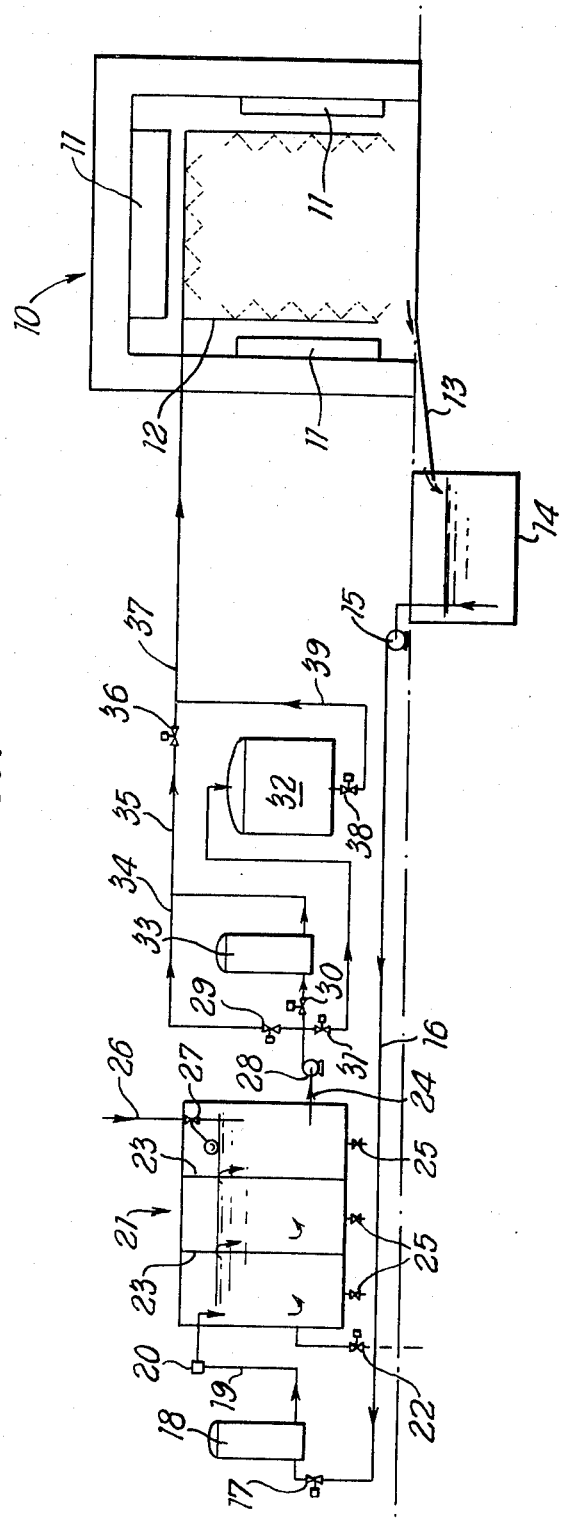
FIG. 1 is a schematic view and circuit diagram of a vehicle washing plant in accordance with the invention.

Turning to FIG. 1 there is shown at 10 a washing chamber of the automatic type in the form of a tunnel into which a car is driven and which is provided with rotary brushes 11 and a system of nozzels 12 which traverse the length of the car to clean it. Such washing chambers are now commonly used and need no further description. However, they normally operate with a single washing cycle and single rinsing cycle. During the washing cycle detergent is infiltrated into the water line to the nozzles and the car is swept both by the nozzles and the brushes. Thereafter the car is swept by the nozzles alone using clean water to rinse off the detergent. There is normally a third, drying cycle in which the car is swept by jets or warm air.

When the car is first subjected to the washing cycle, it is in a very dirty state and the quality of the water is used at this time is not critical. However, it should be free of any grit, sand, gravel and the like which might damage the paint-work of the car. Since the water is collected from the floor through a drain and collects such solid particles care is required to see that they do not enter the water for the washing cycle. However, the presence of a small amount of old detergent or oils and waxes is not harmful.

However, in the rinsing cycle it is essential that the water is of as high a purity as can reasonably be obtained. It should be free of oils and waxes and most of the detergents although a small residual amount of detergent can be tolerated.

The floor of the washing chamber 10 is drained by a drain 13 into a sump 14 where the drain water collects and the larger particles of dirt settle. Water from the sump is periodically pumped by means of a first pump 15 through a conduit 16 and a valve 17 to the first or essential back-wash filter 18.

Back-wash filters are conventional devices which are self-cleaning in operation. Normally, the dirt being collected builds up a pressure within the filter and when this reaches a certain level the direction of flow of water is reversed and the dirt forced out through a waste outlet. This is referred to as a cleansing cycle. Thereafter the filter reverts to its normal operation. Such filters are suitable for filtering off solid particles which are carried in the stream of water but are not normally suitable for filtering more complex contaminants such as oils and waxes. The preferred back-wash filter is a model Q 33 as manufactured by Royles Limited. This operates a pressure of up to 60 lbs. per square inch and is capable of operating at a capacity of about 600 gallons per hour which is what is normally for a car washing plant of the type of FIG. 1. In such a plant each cycle normally uses about 25 gallons of water which is distributed over about 2½ minutes.

The outlet of the back-wash filter 18 is connected by a conduit 19 to a salt detector 20 and through this to the inlet of a settling tank 21.

The salt detector is utilised to detect the presence of any salt in the water being recycled. Salt is often laid down upon roads in order to control snow or ice and is picked up on the car and washed off. If salt is detected it may be necessary to empty the settling tank 21 and to refill the system with fresh water. This may be carried out automatically by operating the discharge valve 22 on the settling tank 21 in response to a signal from the salt detector 20 or it may be done manually in response to a visual indication of the presence of salt on a control panel. Thus it may be necessary to flush out the whole system including the sump prior to or after refilling the settling tank.

The settling tank operates as a reserve store of water, additional to any water remaining in the sump and may for example be of 500 gallons capacity. The settling tank shown in FIG. 1 incorporates two perforated baffles 23 which have the effect of accelerating the settling of any solid particles remaining in the water to a level below that of the tank outlet 24. Further discharge valves 25 may be provided at the bottom of the settling tank for discharge of sludge periodically.

A mains water inlet 26 is provided through an electrically controlled float valve 27, which may be coupled by a re-timer to the discharge valve 22 for automatic refilling of the settling tank when need arises.

A second pump 28 is connected to the outlet 24 of the settling tank. This pump as well as the pump 15 may be electrically operated and should have a capacity of the order of 600 gallons per hour for the particular operation described. The outlet of the pump 28 is led to a three way selector valve system which may consist of a single three way valve or as shown inidividual coupled solenoid operated valves 29, 30, 31. The selector valve system 29, 30, 31 may be controlled from the control panel or via an automatic timed programme which selects the route for the water leaving the pump 28.

The outlet of valve 31 leads to the inlet of the main filter 32. The outlet of the valve 30 leads to a second, optional, back-wash filter 33, which may be the same as filter 18 and the outlet of the valve 29 leads to a conduit 34. The conduit 34 is connected to a second conduit section 35 containing a non-return valve 36 and this in turn leads to a conduit section 37 leading to the inlet of the nozzle system 12 of the washing chamber 10.

The outlet of the back-wash filter 33 leads to the junction of conduit sections 34 and 35. The outlet of the main filter 32 leads to a solenoid operated valve 38 and thence to a conduit section 39 which leads to the junctions of conduit sections 35 and 37.

In operation, waste water from the washing chamber 10 collects through the drain 13 into the sump 14 from which it is pumped by the pump 15 which can be automatically operated whenever the level at the bottom of the sump rises above a predetermined base level. This may be regulated by a float valve (not shown) or simply by resistance of water at the suction end of the conduit leading to the pump. Thus the sump is continually emptied through the backwash filter 18 into the settling tank 21. The valve 17 will normally only be operated during maintenance operations. The operation of the salt detector 20 has already been described. Water is supplied to the inlet of the nozzle system 12 when required, as determined by the automatic car washing programme. This may be a conventional timed sequence of operation which is well known in the automatic vehicle washing plants and needs no further description. When the timing cycle indicates commencement of the washing cycle, the valve 29 is opened, valves 30 and 31 remaining closed, and the pump 28 is switched on causing water to be pumped directly through conduits 34, 35, non-return valve 36 into the conduit 37 and the washing chamber until a signal indicates the end of the washing cycle. It will be appreciated that any solid particles present in the sump water will have been separated out by the back-wash filter 18 and the settling tank 21. It has been found that the presence of a settling tank alone is inadequate unless the tank is of extremely large size to allow an undue time for settling to take place. In such a tank the distance between the inlet and outlet end would have to be extremely long. Furthermore, the total water volume would be unnecessarily high. The backwash filter utilised is automatically self-cleaning and needs very little maintenance and is also extremely efficient. Neither the settling tank nor the backwash 18 will remove detergent, oils and waxes present in the water from the sump; however, the presence of these impurities can be tolerated in the main washing cycle so long as any grit or solid particles which might damage the vehicle are removed.

At the end of the washing cycle it may be necessary to switch off the pump 28 momentarily or alternatively the selector valve system can be directly switched to close valves 29 and 30 and open valves 31. Valve 38 is a maintenance valve and is normally open. Therefore the water is caused to flow directly by means of the pump straight through the main filter 32 into conduit 37 to the nozzles of the washing chamber. Returned flow through conduit 35 is prevented by the non-return valve 36. The main filter will be described hereinafter. It is of sufficient capacity and through-put to allow the necessary rate of water passage, i.e. of the order of 600 gallons per hour. It preferably contains activated carbon over an effective height e.g. of three feet and this has been found to be sufficient to remove all of the oils and waxes present and the bulk of any detergent remaining so that the water used in the rinsing cycle presently being described is of a purity of the same order as that of water from the main supply although trace amounts of detergent may still be present. The main filter is also effective to remove any very small, for example colloidal sized, particles which while they would not damage the car paintwork, would be undesirable in a rinsing cycle.

At the end of the rinsing cycle an appropriate signal will switch off the pump 28 and return all of the valves 29, 30, 31 to the closed position; alternatively if the pump 28 is effectively self-sealing the valve system may be returned to the position required for the next washing cycle.

Back-wash filters e.g. of the type specified have pressure sensitive protectors and that of the filter 33 may be coupled to the valve 29 to open the valve 29 in the event that a cleansing cycle begins at a time when water is required through this filter. The selective use of this filter has already been described.

Turning to FIG. 2, the filtration apparatus shown comprises an inlet header 110 connected over an upper receptacle 111 for receiving a filter medium, which in turn is located over a lower receptacle 112 for receiving a filter medium, which in turn is located over an outlet header 113, these components being sealingly connected in series from top to bottom.

The inlet header 110 is formed from pressed steel sheet, which may be of stainless steel depending upon the applications. It has a generally dome shaped upper surface 114 and a cylindrical lower surface portion 115 which is externally reinforced with an angle section to member 116 and triangular strut 117. A bolting collar or flange 118 is welded around the reinforcement 116. A pressure indicator 120 may be fitted to the upper surface portion 114 of the inlet header. An inlet connection 121 is provided at the central point or axis and underneath the inlet connection a spreader plate 122 is suspended from the upper surface portion of the header by means of welded legs 123.

The upper filter receptacle 111 comprises a peripheral wall 124 which is cylindrical and formed from sheet steel. The wall 124 is welded to an annular collar 125 at its lower end and bolted to the annular collar 125 is a foraminous screen 126 for retaining the filter granules. The upper end of the peripheral wall 124 is welded to a steel collar or flange 127 which is bored to receive bolts 140 in similar positions to borings on the flange 118. A second screen 128 of foraminous material is shown bolted over the flange 127 for further distribution of the liquid to be filtered and for safer retention of the granules. However, this screen may be considered optional if for example the normal procedure is to empty and refill the receptacle 111 rather than simply to change the receptacle for a fresh complete receptacle. The collars or flanges 118, 125, 127 are of heavier gauge materials than the remainder of the apparatus described.

The lower filter receptacle 112 is formed integrally with the outlet header 113 in this embodiment. This integrated unit is formed as a container made up of a cylindrical peripheral wall portion 128 welded to a circular floor 129. A short way up the wall 128 there is welded an internal flange 130 of heavy gauge steel and which acts as a support for a foraminous screen 131 forming the floor of the lower filter receptacle 112 and the top of the outlet header 113. The screen 131 is bolted to the flange 130.

At the upper end of the wall 128 there is welded an external annular bolting collar or flange 132 and there may also be welded an internal flange 133 which extends substantially as far as the wall 124 of the upper filter receptacle 111.

The flange 132 is bored in alignment with the bores on the flanges 118 and 127 so that bolts 140 may be fitted through the three flanges. The three flanges are bolted together with intervening rubber gaskets 134, 135.

An outlet connection 136 is provided centrally in the floor 29 of the outlet header, and the whole apparatus is supported as shown on four legs 137 only, one of which is visible in the drawings and which are welded to the wall 128.

The upper and lower filter receptacles may be filled with activated carbon for example as sold by the United Kingdom National Coal Board under the Trade Mark ANTHRASORB CC8 18. For this purpose the same material may be used in the upper and lower receptacles but naturally different media can be used if desired. Other suitable filter media would include other forms of activated carbon, anthractie, limestone, woven or unwoven fabric sheeting, sponge material such as polyurethane or polyether sponge, glass-wool, as well as sand, gravel, asbestos, mica, vermiculite and the like. A typical filter which allows the passage of 600 gallons per hour of water is approximately three foot in diameter and contains activated carbon over an effective height of three feet in all. The upper filter receptacle may but need not necessarily be embedded partially or wholly in the filter medium underneath. Larger filters may be used if greater purity is demanded.

The filtration apparatus of FIG. 3 is similar in many respects to that of FIG. 2 and the same reference numerals will be used for similar components. Only the differences from the embodiment of FIG. 2 will be described. Thus the inlet header is identical in all respects to that of FIG. 2. Furthermore, the external casing comprising the peripheral wall 128, floor 129, outlet connection 136, and legs 137 are identical. An internal flange 230 is formed in essentially the same position as flange 130 of FIG. 2 but is not bored for bolting to a foraminous plate. In this embodiment the whole of the interior of the exterior casing is filled with a column of abutting filter receptacles which may for example be five in number. The upper receptacle 211 is formed essentially similarly to the receptacle 111 of FIG. 2 except that the lower collar 225 extends as an external flange, outwardly of the wall 224.

The lower filter receptacle as typified by a receptacle 300 are generally similar except that the upper flange 327 extends only outwardly over the peripheral wall 324. The lower flanges of the lower receptacles 300 are numbered 325 and their foraminous floors are numbered 326. The foraminous floor of the upper receptacle is numbered 226, and the roof 228. This is again optional.

The lowermost of the receptacles 300 rests upon the interior flange 230 of the casing with the interposition of a rubber gasket 231. A relatively thick rubber gasket is used in this position and in the position of the gasket 135. This may for example be of ¼ inch thickness, whereas the gasket interposed between the interior inter-receptacles and indicated at 232 may be of less a thickness for example ⅛ inch. The dimensions are such that when the receptacles are fitted in place and the header 110 bolted on, the gaskets are all compressed so that the whole column of receptacles is effectively sealed. The sealing between the intermediate receptacles in this embodiment is not critical since if there is leakage the intervening space 233 between the receptacles and the casing 128 will fill with liquid which will itself effectively seal the column.

It is not necessary for the lowermost receptacle in this embodiment to be replaceable and it may be formed within the body of the container as in the embodiment of FIG. 2, the lowermost of the replaceable receptacles 200 resting on a flange similar to the flange 130 placed above the flange 230. The flange 230 could then be formed identically with the flange 130, with a bolted foraminous screen 131 upon which the lowermost bed of filter medium can rest.

Many modifications will be apparent to those skilled in the art within the scope of the invention as designed in the claims. For example it may in some cases be unneccessary to utilise an outer casing like the casing 128 but instead, the headers and a column of receptacles could be held together by tie rods.

A filter of the type shown in FIG. 3 contains different filter media in different layers. Various filter media may be used, a typical combination being, proceeding downwards, coarse sand, fine sand, limestone, and two beds of activated carbon. The filters of FIGS. 2 and 3 are built to withstand pressures of the order of 60 lbs. per square inch or more and may generally be constructed to pass from one hundred to six thousand gallons per hour depending upon the application.

It will be appreciated that the settling tank 21 of FIG. 1 requires replenishing to make up the natural losses of water and this is supplied from the mains inlet 26 through the electrically controlled float valve 27. In order that mains water is not supplied during the washing and rinsing operations while part of the water is being transferred to the sump 14, the valve 27 may be automatically switched off for this period and for a period afterwards to allow time for water from the sump 14 to be pumped back into the settling tank.

A filter of the type shown in FIG. 3 may be used typically also for cleaning alkaline solvent mixtures for example containing methylene chloride and sold for example under the Trade Mark Ardrox, for cleaning engine components. A filter for this purpose may for example be three feet in diameter and six feet or more in height. Various filter media may be used, a typical combination being, proceeding downwards, coarse sand, fine sand, limestone, and two beds of activated carbon. However a filter for the same purpose may also have only a single detachable tray, like that of FIG. 2.

In the treatment of alkaline solvent mixtures containing oily residues, it may be necessary or desirable to pretreat the effluent with a substance to break the emulsion, e.g. a mineral acid or an electrolyte or an organic emulsion breaker. This will prolong the life of the expensive carbon, as much of the contaminating material will be removed on the less expensive upper filter medium.

What is claimed is:

1. In a vehicle washing plant fitted with a vehicle washing chamber having an inlet and a drain, a sump connected to the washing chamber drain and a water recycling circuit providing water for a washing cycle and a rinsing cycle, the improvement wherein the recycling circuit comprises:
  at least one backwash filter, said backwash filter being self-cleaning in response to the predetermined build-up of pressure at its inlet;
  a first pump connected between said sump and said backwash filter inlet;
  a wash water settling tank fitted with longitudinally spaced generally vertical baffles and a self-regulating make-up water inlet valve and an outlet valve adjacent a clean water and of the tank and a dirty water inlet at the opposite end, said dirty water inlet communicating with the outlet of said backwash filter;
  a selector valve system having an inlet branch and at least two outlet branches;
  a second pump connected between the outlet of said settling tank and said inlet branch of said selector valve system;
  a main filter containing activated carbon granules, said filter comprising an inlet, an outlet, a larger downstream filter bed and a smaller replaceable upstream filter bed;
  said inlet of said main filter being connected to the outlet of said settling tank through said second pump and said inlet branch and a first outlet branch of said selector valve system, and said outlet of said main filter being connected to said inlet of said washing chamber, whereby water for said rinsing cycle in said washing chamber is withdrawn from said settling tank outlet through said main filter; and
  a filter by-pass conduit connected between a second outlet branch of said selector valve system and said washing chamber inlet, whereby water for said washing cycle in said washing chamber is withdrawn directly from said settling tank outlet through said second pump and said inlet branch and said second outlet branch of said selector valve system.

2. A plant as claimed in claim 1 wherein said selector valve system includes three outlet branches, the plant including a second backwash filter similar to said first mentioned backwash filter and having an inlet and outlet and having its inlet connected to said third branch of said selector valve system and its outlet connected to said washing chamber inlet.

3. A plant as claimed in claim 2 wherein the conduit connecting said washing chamber inlet and said main filter outlet is connected via a non-return valve to a junction of said second backwash filter outlet conduit and said filter by-pass conduit.

* * * * *